US009135542B2

(12) United States Patent
O'Dell et al.

(10) Patent No.: US 9,135,542 B2
(45) Date of Patent: Sep. 15, 2015

(54) HANDHELD SCANNER DEVICE WITH DISPLAY LOCATION DATABASE

(75) Inventors: Gregory S. O'Dell, Kansas City, MO (US); Daniel R. Ferrell, Liberty, MO (US); David E. Caldwell, Kansas City, MO (US)

(73) Assignee: HALLMARK CARDS, INCORPORATED, Kansas City, MO (US)

( * ) Notice: Subject to any disclaimer, the term of this patent is extended or adjusted under 35 U.S.C. 154(b) by 0 days.

(21) Appl. No.: 13/480,745

(22) Filed: May 25, 2012

(65) Prior Publication Data

US 2012/0233041 A1    Sep. 13, 2012

Related U.S. Application Data

(63) Continuation of application No. 11/170,718, filed on Jun. 29, 2005, now Pat. No. 8,190,497.

(60) Provisional application No. 60/585,472, filed on Jul. 2, 2004.

(51) Int. Cl.
*G06K 17/00* (2006.01)
*G06Q 10/08* (2012.01)
(Continued)

(52) U.S. Cl.
CPC .......... *G06K 17/0022* (2013.01); *G06Q 10/087* (2013.01); *G06Q 10/0875* (2013.01);
(Continued)

(58) Field of Classification Search
CPC ..... G06Q 10/087; G06Q 10/08; G06Q 10/06; G06Q 20/203

USPC .......................................................... 705/28
See application file for complete search history.

(56) References Cited

U.S. PATENT DOCUMENTS 5,057,677 A    10/1991    Bertagna et al.
5,505,473 A     4/1996    Radcliffe et al.
(Continued)

FOREIGN PATENT DOCUMENTS

GB    2336925    11/1999
JP    63184165    1/1987

OTHER PUBLICATIONS

Middleton, Alan Charles. Private label or public brand? Brand meaning contrasts between retailer brands and manufacturer brands of grocery packaged goods. York University (Canada), ProQuest, UMI Dissertations Publishing, 1996.*
(Continued)

*Primary Examiner* — Ryan Zeender
*Assistant Examiner* — Fawaad Haider
(74) *Attorney, Agent, or Firm* — Shook, Hardy & Bacon L.L.P.

(57) ABSTRACT

A method of managing inventory may include using a handheld scanning device to locate one or more inventory items on a retail display. The method may further include scanning the identification symbols of inventory items on a retail display to determine the type of the scanned item. An associated apparatus may include a communication interface to receive information from a remote database and to send information to a remote server. The received information may include predetermined information about proper locations for individual inventory items on the retail display, thereby reducing the need to manually determine the proper locations of multiple inventory items, which may be, for example, greeting cards on a retail store display.

16 Claims, 6 Drawing Sheets

(51) Int. Cl.
*G06Q 20/20* (2012.01)
*G06Q 30/06* (2012.01)

(52) U.S. Cl.
CPC .......... *G06Q20/203* (2013.01); *G06Q 30/0621* (2013.01); *G06Q 30/0643* (2013.01); *G06K 2017/0051* (2013.01)

(56) References Cited

U.S. PATENT DOCUMENTS

| | | |
|---|---|---|
| 5,794,213 A | 8/1998 | Markman et al. |
| 5,850,187 A | 12/1998 | Carrender et al. |
| 5,850,594 A | 12/1998 | Cannon et al. |
| 5,874,722 A | 2/1999 | Rando et al. |
| 5,905,248 A | 5/1999 | Russell et al. |
| 5,913,210 A | 6/1999 | Call et al. |
| 5,940,808 A | 8/1999 | Joseph et al. |
| 5,978,773 A | 11/1999 | Hudetz et al. |
| 5,979,757 A | 11/1999 | Tracy et al. |
| 6,014,429 A | 1/2000 | LaPorta et al. |
| 6,105,004 A | 8/2000 | Halperin et al. |
| 6,182,053 B1 | 1/2001 | Rauber et al. |
| 6,199,048 B1 | 3/2001 | Hudetz et al. |
| 6,370,515 B1 | 4/2002 | Diamond et al. |
| 6,401,076 B1 | 6/2002 | Hall et al. |
| 6,533,173 B2 | 3/2003 | Benyak |
| 6,553,412 B1 | 4/2003 | Kloba et al. |
| 6,587,034 B1 | 7/2003 | Heiman et al. |
| 6,604,681 B1 | 8/2003 | Burke et al. |
| 6,644,549 B1 | 11/2003 | Swartz |
| 6,707,581 B1 | 3/2004 | Browning |
| 2002/0004752 A1 | 1/2002 | Kuma |
| 2002/0023959 A1 | 2/2002 | Miller et al. |
| 2002/0030105 A1 | 3/2002 | Miller et al. |
| 2002/0034067 A1 | 3/2002 | Massaro |
| 2002/0091593 A1 | 7/2002 | Fowler |
| 2002/0092912 A1 | 7/2002 | Hamilton et al. |
| 2002/0111869 A1 | 8/2002 | Shuster et al. |
| 2002/0133411 A1 | 9/2002 | Nakamoto et al. |
| 2002/0188513 A1 | 12/2002 | Gil et al. |
| 2002/0190128 A1 | 12/2002 | Levine et al. |
| 2003/0014317 A1 | 1/2003 | Siegel et al. |
| 2003/0036985 A1 | 2/2003 | Soderholm |
| 2003/0055700 A1 | 3/2003 | Hoffman et al. |
| 2003/0055731 A1 | 3/2003 | Fouraker et al. |
| 2003/0055750 A1 | 3/2003 | Menninger |
| 2003/0061102 A1 | 3/2003 | Menninger et al. |
| 2003/0069794 A1 | 4/2003 | Hoffman et al. |
| 2003/0069814 A1 | 4/2003 | Hoffman et al. |
| 2003/0078845 A1 | 4/2003 | Hoffman et al. |
| 2003/0088442 A1 | 5/2003 | Michael et al. |
| 2003/0088472 A1 | 5/2003 | Offutt et al. |
| 2003/0126046 A1 | 7/2003 | Kataoka et al. |
| 2003/0154135 A1 | 8/2003 | Covington et al. |
| 2003/0155422 A1 | 8/2003 | Kawakami et al. |
| 2003/0160101 A1 | 8/2003 | Wiedenhoefer |
| 2003/0178488 A1 | 9/2003 | Southard |
| 2003/0178489 A1 | 9/2003 | Boukhny et al. |
| 2003/0181168 A1 | 9/2003 | Herrod et al. |
| 2003/0191688 A1* | 10/2003 | Prince et al. .................... 705/14 |
| 2003/0212602 A1 | 11/2003 | Schaller |

OTHER PUBLICATIONS

Teresko, John, Winning With Wireless, Jun. 2003, Industry Week, v252n6, p. 60-66.
Field Web: Starlink Replacement Project—Statement of Work, Hallmark; Dec. 20, 2002, 25 pages.
Hallmark Cards Crafts Creative Technology Solutions with Symbol [online], Symbol The Enterprise Mobility Company, [retrieve on Jun. 28, 2004]. Retrieved from the Internet: <URL:www.symbol.com/solutions/retail/ retail_genmerch_cs_hallmark.html>.
PDT 3100 Series Portable Data Terminals, [online] Symbol The Enterprise Mobility Company, [retrieved on Jun. 28, 2004], Retrieved from the Internet: <URL:www.symbol.com/products/mobile_computers/mobile?kb-pdt_3100.html>.
Examination Report in GB Application No. 0513585.0 dated Jan. 30, 2007, 2 pages.
Combined Search and Examination Report received in GB0807333.0, mailed Jul. 25, 2008, 63 pages.
Canada Office Action mailed May 1, 2013 re Canadian Appln. 2,511,231, 4 pgs.

* cited by examiner

HANDHELD SCANNER DEVICE WITH DISPLAY LOCATION DATABASE

CROSS-REFERENCE TO RELATED APPLICATIONS

The present application is a continuation of pending U.S. application Ser. No. 11/170,718, entitled "Handheld Scanner Device With Display Location Database," filed Jun. 29, 2005, and which claimed the benefit of and priority to commonly owned U.S. Provisional Application Ser. No. 60/585,472, filed Jul. 2, 2004, and titled "Handheld Scanner Device With Display Location Database," which is incorporated by reference in its entirety.

TECHNICAL FIELD

This disclosure describes display and inventory systems which, in particular embodiments, comprise handheld scanner devices with a remotely synchronized retail display location database.

BACKGROUND

To capture the attention of shoppers, retail establishments often provide attractive and engaging sales displays that present many different inventory items in a manner designed to encourage the shoppers to purchase said items. As displays become more complex and present increased numbers and varieties of inventory items, display and inventory management and maintenance becomes increasingly complicated.

Greeting card displays often contain a large number of product locations or pockets to categorize the cards or gift objects according to the appropriate type, purpose, or function. A consumer browsing for a birthday card may select a card for examination, for example, but then may return the card to an incorrect display location if they decide not to purchase it. This may cause other cards or display items to be obscured and may prevent future shoppers from noticing the obscured items, thereby decreasing the likelihood that the obscured items will be purchased.

From the perspective of the workers who maintain or re-order inventory items for such a display, errors in stocking or maintaining the display with inventory items may occur, such as misplacement, mislabeling, failing to timely reorder an item, or prematurely ordering an already sufficiently stocked item. These errors may be compounded where inventory items are displayed in close proximity to one another, where a large number of items are displayed, or where the items are similar in overall shape and appearance and thus may easily be mistaken for other inventory items.

One source of errors that may occur while maintaining a display of multiple inventory items may arise from manually performing certain labor-intensive operations. For example, to count multiple inventory items on a display may involve an employee manually reading and recording product identifiers, such as a Universal Product Code (UPC), for each inventory item. After taking such a count, the employee may also manually determine which item categories need to be re-ordered or returned. The employee may process re-orders or returns, for example, by assembling a purchase order and mailing it to a supplier, or by placing a telephone call to the supplier.

SUMMARY

A method of managing inventory may include using a handheld scanning device to locate one or more inventory items on a retail display. The method may further include scanning the identification symbols of inventory items on a retail display to determine the type of the scanned item. An associated apparatus may include a communication interface to receive information from a remote database and to send information to a remote server. The received information may include predetermined information about proper locations for individual inventory items on the retail display, thereby reducing the need to manually determine the proper locations of multiple inventory items, which may be, for example, greeting cards on a retail store display.

In one aspect, the method of managing inventory further includes determining the number and type of item stored in each location, and retrieving from a data storage device a reorder quantity for a selected type of the inventory items. If the determined number of the selected type of inventory items is less than the reorder quantity, then the method includes generating a signal to reorder the selected type.

In another aspect, the handheld scanning system further includes a scanner to read identification symbols on a product, and a memory containing a program of instructions that, when executed by a processor, identifies a retail display location corresponding to the product based on scanned identification symbols and information received from a remote database. In the system, the processor is coupled to the scanner, the communication interface, and a display device.

Certain embodiments may provide one or more of advantages. For example, items in a retail store display may be more quickly and accurately placed in their assigned locations by referring to location information displayed by the device. This displayed information may eliminate the need to visually search for matches between labels on products and labels on assigned locations on the store display. Moreover, time to count inventory and to place reorders to replenish inventory may be reduced. As such, products on a retail store display may be quickly and efficiently maintained, including straightening and re-organizing displays, thereby reducing labor and/ or improving the accessibility of the inventory to customers.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference symbols in the various drawings indicate like elements.

DETAILED DESCRIPTION

Figure 1:
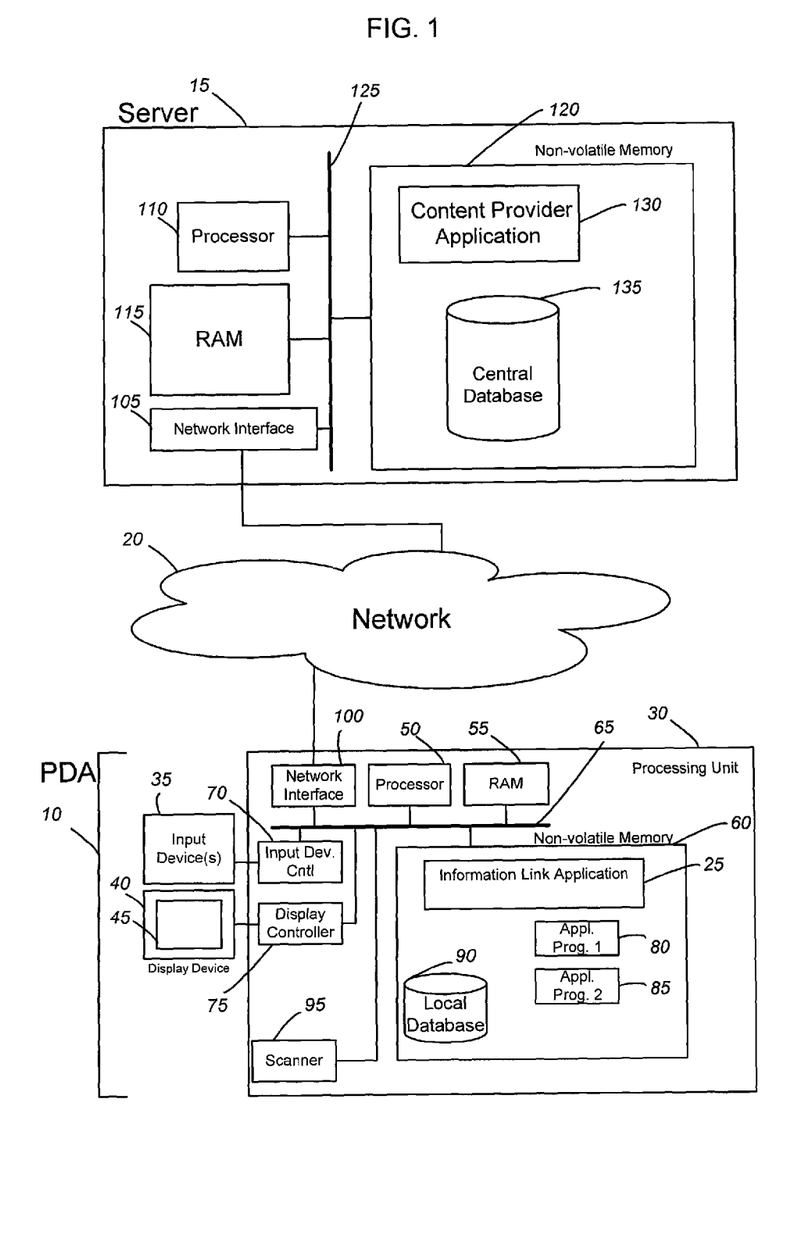
FIG. 1 is a block diagram of a management and maintenance system that may utilize aspects of the invention.

FIG. 1 shows a block diagram of a handheld computer system 10, a central server 15, and a network 20, over which the handheld computer system 10 may communicate with the server 15. In one embodiment, the handheld computer system 10 is a personal digital assistant (PDA) and may utilize an information link software application 25 to perform various inventory management tasks, including identifying a proper location for an inventory item in a store's display, for example, as well as tracking inventory sales, inventory shelf-time, inventory shipments, etc., and for replenishing point of sale (POS) inventory stock as needed through reordering. The information link application 25 may further facilitate messaging, for instance between an on-site retail merchandiser employee at a retail store and a supervisor at company headquarters, which may provide a convenient communications channel for receiving instructions or questions, for surveying store personnel, or for relaying audit assessments, for example. Moreover, the information link application 25 may be used to track actual or budgeted work hours for employees, such as retail merchandisers (RM) or territory assistants (TA) who may service several retail locations within a geographical or functional area, or for one or more corporate clients. One or more PDAs 10 may be used independently or in conjunction with one or more servers 15 to perform inventory management, messaging and time reporting tasks.

The handheld computer system 10 includes a processing unit 30, one or more input devices 35, and a display device 40 with a screen 45, upon which a user may be presented displays. The processing unit 30 includes a processor 50, random access memory (RAM) 55, and non-volatile storage memory 60, all interconnected by a system bus 65. Input device controllers 70, also connected to the system bus 65, receive command signals from input devices 35 and forward the command signals in the appropriate format for processing. A display controller 75, connected to the system bus 65, receives display command signals and generates the appropriate signals that are forwarded to the display device 40 so that the desired display is provided on the screen 45.

The handheld computer system 10 is not limited to a PDA, but could instead include a cell phone, a wearable device such as a wristwatch, a laptop computer, an information kiosk, or other type of terminal, or other such devices. Processor 50 can include a microcontroller, microprocessor, digital signal processor, or the like. RAM 55 can include static or dynamic RAM (SRAM, DRAM, respectively), non-volatile RAM (NVRAM) and the like.

The information link application 25 is stored in the PDA's non-volatile memory 60, which provides persistent data storage including magnetic disk memory, flash memory, removable non-volatile storage media, and the like. Various application programs 80, 85, etc., include program instructions that may be loaded into RAM 55 during operation, as is conventional. Processor 50 then may execute the program instructions to perform desired program functions. Non-volatile memory 60 also includes, in this embodiment, a local database 90 that may store data corresponding to inventory information for several retail locations. The local database 90 need not be internal, but could instead include removable non-volatile storage media or an external storage device. The components just described could be combined or separated in various manners, and could be stored in various manners, such as on various non-volatile storage media.

Computer system 10 includes an integrated scanner 95 for scanning identification symbols, such as universal product code (UPC) bar codes. The scanner 95 is connected to the system bus 65 and provides a user with a convenient means of quickly and accurately capturing an identification symbol into the handheld computer system 10 so that the information link application 25 may process the symbol. In other embodiments, an external scanner may be used, and scanned codes may be communicated to the PDA 10 by wired or wireless communication methods. Computer system 10 further includes a network interface 100 connected to its system bus 65, and to network 20. As such, computer system 10 may access server 15 via network 20 to run applications residing on the server 15, to add, delete, or modify information residing on the server 15 or to otherwise communicate with the server 15. Network 20 may be, for example, a local area network (LAN), wide area network (WAN), a telephone line, or the Internet.

Server 15 includes a network interface 105, one or more processors 110, RAM 115 and non-volatile memory 120, all interconnected by a bus 125. The server's network interface 105 provides the connection to network 20. The server 15 has, in this embodiment, non-volatile memory 120 that includes a content provider application 130 and a central database 135. In an embodiment, the central database may contain data comprising a master chart for each retail location. Each master chart may include data for each display within the retail location, including data identifying each pocket or location within the display, the inventory item type or types that should populate each display location, the current display location of every individual inventory item in the display, and an item count or counts for each display location. Other information stored in the database 135 might include shipment information, assignment information, territory coverage information, product pricing and availability information, information on discounts, and scheduling information.

The content provider application 130 may be used to control communication with handheld computer systems 10, to build and schedule queries to the central database 135, to provide virus protection, and to permit data additions, deletions, or modifications to the central database 135. While a single server 15 is shown in FIG. 1, in other embodiments additional servers may be used, including an application server, a communications server, a web server, a secure shell (SSH) server and an exchange server. Similarly, the central database 135 may be external and multiple databases can be used.

A user can use an input device 40, such as a keyboard or keypad, trackball, stylus, mouse, joystick, etc., to provide input and make selections that can affect application program operation. An output device such as a printer can be used to print information from the PDA 10 at the POS location, for example. Devices such as memory controllers, power supplies, etc., are omitted from FIG. 1 for simplicity. The components described with regard to FIG. 1 could be combined or separated in various manners. Any of the entities described above in handheld computer or server non-volatile memory 60 or 120 could alternatively be located in a separate server, database, or computer system, and could be stored on various non-volatile storage media. In one embodiment, the local database 90 stores information that comprises a subset of the data stored in the central database 135, but in other embodiments the local database 90 may include information not stored in the central database 135. The information link application 25 may further be used to synchronize the local and central databases 90, 135, including transferring information between the databases 90, 135 as appropriate.

Figure 2:
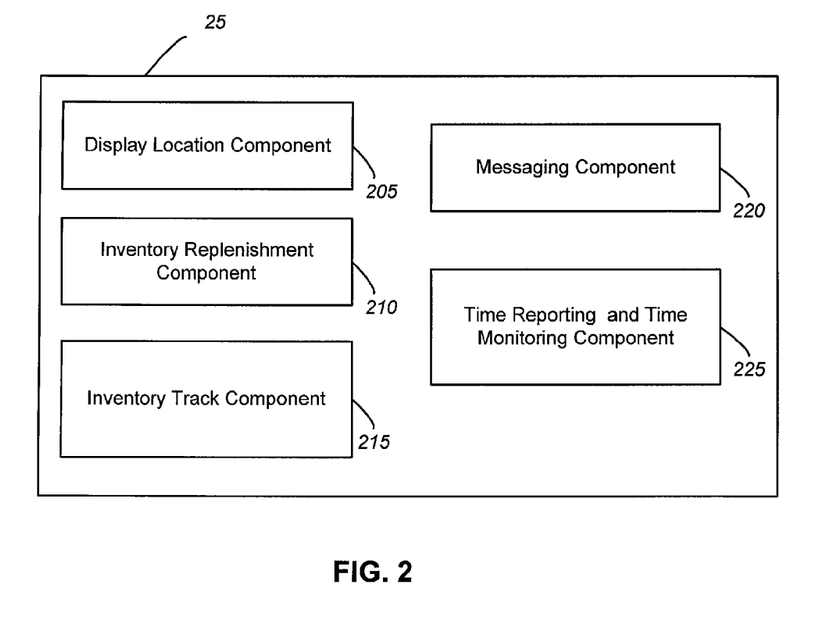
FIG. 2 is a conceptual depiction of an information link software application.

A retail merchandiser, territory assistant, or retail store employee who may be responsible for in-store service of a number of retail locations, may utilize aspects of the invention to perform display and inventory management and maintenance tasks, including straightening and reorganizing displays, reordering product and taking inventory of unsold product after a holiday season, for example. FIG. 2 shows a conceptual depiction of the information link software application 25, which includes several component modules 205-225.

Figure 3:
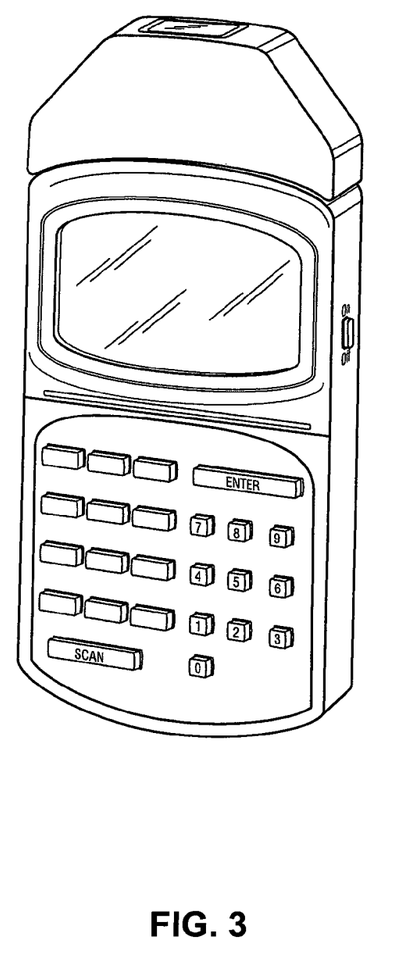
FIG. 3 is a perspective view of a handheld computer system that may utilize aspects of the invention.

A display location component 205 can be used to identify the proper home pocket or display location for a given greeting card or inventory item. This pocket look-up procedure may begin, for example, with a user scanning a UPC code on a greeting card with the handheld computer system 10. Referring now to FIG. 3, an exemplary handheld computer system 10 is shown. The user may use the integrated scanner 95, which includes a scan window 305, to scan the card's UPC code, and may initiate the scan by pressing a "SCAN" button 310. Bar code scanning technology is known in the art, and will not be discussed here. The display location component 205 may perform error checking and notification, if applicable, and may then cause the scanned code to appear, for example, on screen 45. The display location component 205 may then access the local database 90 and retrieve information corresponding to the correct display location for the scanned card, which information may also be displayed on screen 45. The user may then scan a location ID code corresponding to the card's current location (which may be located on the display pocket, for example) and the display location component 205 may determine whether the scanned card was in the correct location by comparing the scanned location ID with the retrieved location information. Assuming an incorrect initial placement, the PDA 10 may display and/or describe the correct location on screen 45, and the user can reshelf the card in the correct display pocket. Alternatively, the central database 135 may be queried to determine the proper display location.

A similar procedure can be followed when placing new merchandise items in a display. The item's bar code can be scanned using the PDA 10. One or both of the databases 90, 135 can be accessed to determine the proper display location for the item. The proper location can be displayed to the user, and the item can be placed in the corresponding location. As such, these functions may save time by eliminating the need to "sight match" an item to a display, which may be difficult for an inexperienced employee or when a complex display is involved, and may further reduce the number of stocking errors that might otherwise occur.

Optionally, a plurality of display locations may be associated with a product. Accordingly, the information link application may retrieve from the database and display to the user information relating to a plurality of locations corresponding to the scanned product. As discussed in more detail below, the application may permit a user to scroll through the information relating to the various locations corresponding to the scanned product.

Referring again to FIG. 2, an inventory replenishment component 210 permits POS replenishment of inventory stock. For example, a user may scan the bar codes of all cards or items in a given display pocket with the handheld computer system 10. The inventory replenishment component counts and tracks the number of cards or display items scanned and classifies each item based on the item's type. As such, the inventory replenishment component 210 may determine the inventory quantity on hand. Next, the inventory replenishment component 210 may access the local database 90 or the central database 135 to determine a "reorder quantity" for the corresponding display location or item type, compare the reorder quantity with the quantity on hand, and determine whether fresh stock should be ordered. If so, the inventory replenishment component 210 may provide automated reorder functionality. Moreover, the inventory replenishment component 210 may determine whether outstanding orders exist (for example, by accessing one of the databases 90, 135), and may use this information to adjust the order quantity.

An inventory track component 215 may work independently or in conjunction with the inventory replenishment component 210 to track inventory shipments, including shipment departures from suppliers or distributors, transitional stopovers and arrivals at retail locations. This may facilitate better scheduling of territory assistant store visits, and may eliminate unnecessary travel expenses and save time.

A messaging component 220 may permit two-way messaging between employees working in the field, or between an employee and a supervisor. Alternatively, automated messages such as daily or weekly reminders may be communicated to or from the handheld computer system 10 using the messaging component 220. In this manner, work and travel schedules, sale and promotion information, notice of inventory shortages, store audit information and the like may be communicated to or from the user of a handheld computer system 10. An Internet website may be hosted where summary reports of activities, messages, responses, audits, orders, etc., may be displayed, thereby facilitating convenient access for employees and supervisors. The website may be password protected.

A time reporting and time monitoring component 225 can be used to manage and track an employee's schedule and workload. For example, a territory assistant may be assigned to service several retail stores during a given week. In one embodiment, the territory assistant receives a weekly work schedule comprising a list of stores and a budgeted work allowance in advance as described above with reference to the messaging component 220. When the territory assistant arrives at the first store, she may use a handheld computer system 10 to scan a store identification code, and an automatic timer may begin to log time. The territory assistant may log-out, for example, by pressing a button 35 (FIG. 3) on the handheld device 10, or by scanning a log-out code during breaks or when the store service has been completed. At this point, the timer will stop and the actual amount of time worked can be determined and compared to the budgeted work allowance. The time reporting and time management component 225 may be configured to report this information to the central server 15, where it may later be reviewed by a supervisor or incorporated into a project status report, for example.

A single handheld computer system 10 may serve multiple users. For example, a team of three territory assistants may make a service call to a retail store, and each may log in to a single PDA 10 using separate identification IDs. The time reporting and monitoring component 225 can separately track, monitor, and report for multiple users. Alternatively, each territory assistant may be equipped with a handheld computer system 10 and wireless communication technologies known in the art (such as Bluetooth or the like) may permit communication and cooperation among the three systems 10. For instance, one system 10 may be designated a "master" unit, while the other two units 10 may be designated "slave" units. As such, the slave units 10 may communicate information (item counts, error counts, display information, reorder needs, etc.) to the master system 10, which may then assemble the received information from the slaves, in conjunction with its information, and produce a master report for communication to the server 15.

In one implementation, the information link application 25 is made up of several different application program modules, some of which reside on a central server, such as server 15, while others reside on a local computer system, such as handheld system 10. In other implementations, the information link application 25 can reside entirely on the handheld computer system 10 (as depicted in FIG. 1), or entirely on the server 15.

Figure 6:
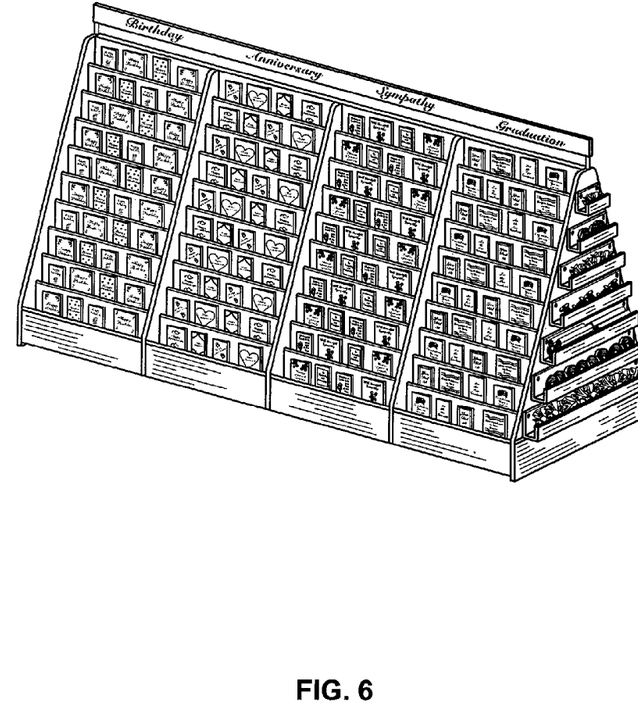
FIG. 6 is an illustrative depiction of a retail display.

FIG. 6 shows an illustrative depiction of a retail display 600 with a greeting card section 605 and gift item section 610. The card section 605 has four columns 615-630, and several rows 635, 640, 645, etc., per column. A birthday card 650 is shown in a display location corresponding to column 615 and row 635. Referring now to the flowchart of FIG. 4, a process performed by a processor executing instructions from an information link application begins, at step 405, with the receipt of an identifier corresponding to a display location, such as the location defined by column 615 and row 635 of display 600. Next, at step 410, an identifier corresponding to an inventory item, such as birthday card 650, is received.

Figure 4:
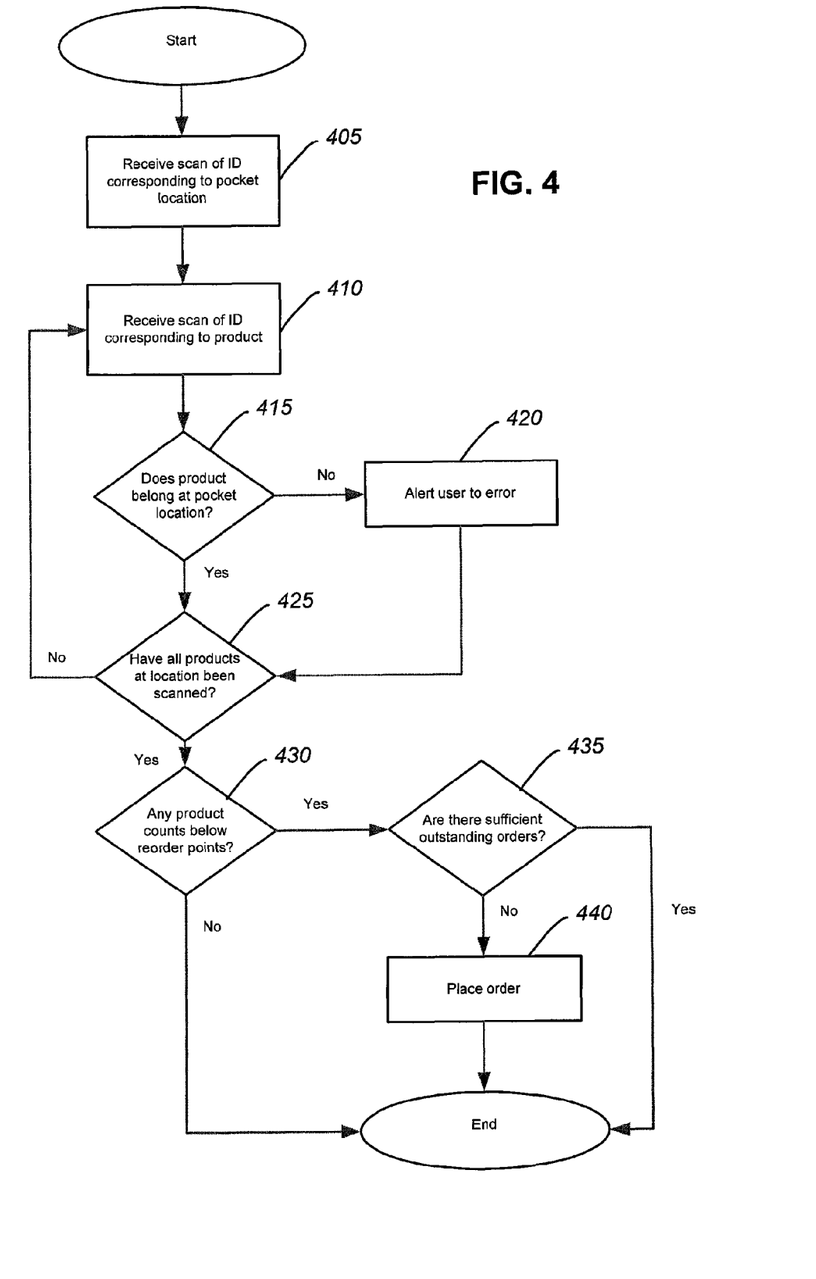
FIGS. 4-5 are flowcharts that illustrate examples of how an information link software application may operate.

Local database 90 or central database 135 may be accessed to determine the correct display location of the birthday card 650, and the correct location can be compared to the current location at step 415. If an error exists (as it might if certain other items, such as cards 655, 660, or ribbon 665, had been scanned), then the user may be alerted at step 420, for example with an error message on screen 45. An input may be received to indicate whether all items at this display location have been scanned (425). For example, the user may press one or more buttons 35 to indicate either that all items at the location have been scanned, or that additional items remain, in which case steps 410-420 may repeat. In this example, three additional cards 670 remain to be scanned at the location of interest.

When all of the items at a given location have been scanned, reorder values for the appropriate items may be obtained from a database 90, 135 to determine if the quantity on hand is insufficient at step 430. If so, inventory shipment information (quantities ordered, estimated arrival times, etc.) may be retrieved from a database 90, 135 at step 435 and an order can be placed (440), if necessary. Alternatively, after receiving an identification code, such as a UPC code, the information link application 25 may translate the code to a corporation-specific stock keeping unit (SKU), and use this SKU when accessing either the local database 90 or the central database 135. This may be appropriate if the database indexes records to SKU values rather than UPC values, for instance.

Figure 5:
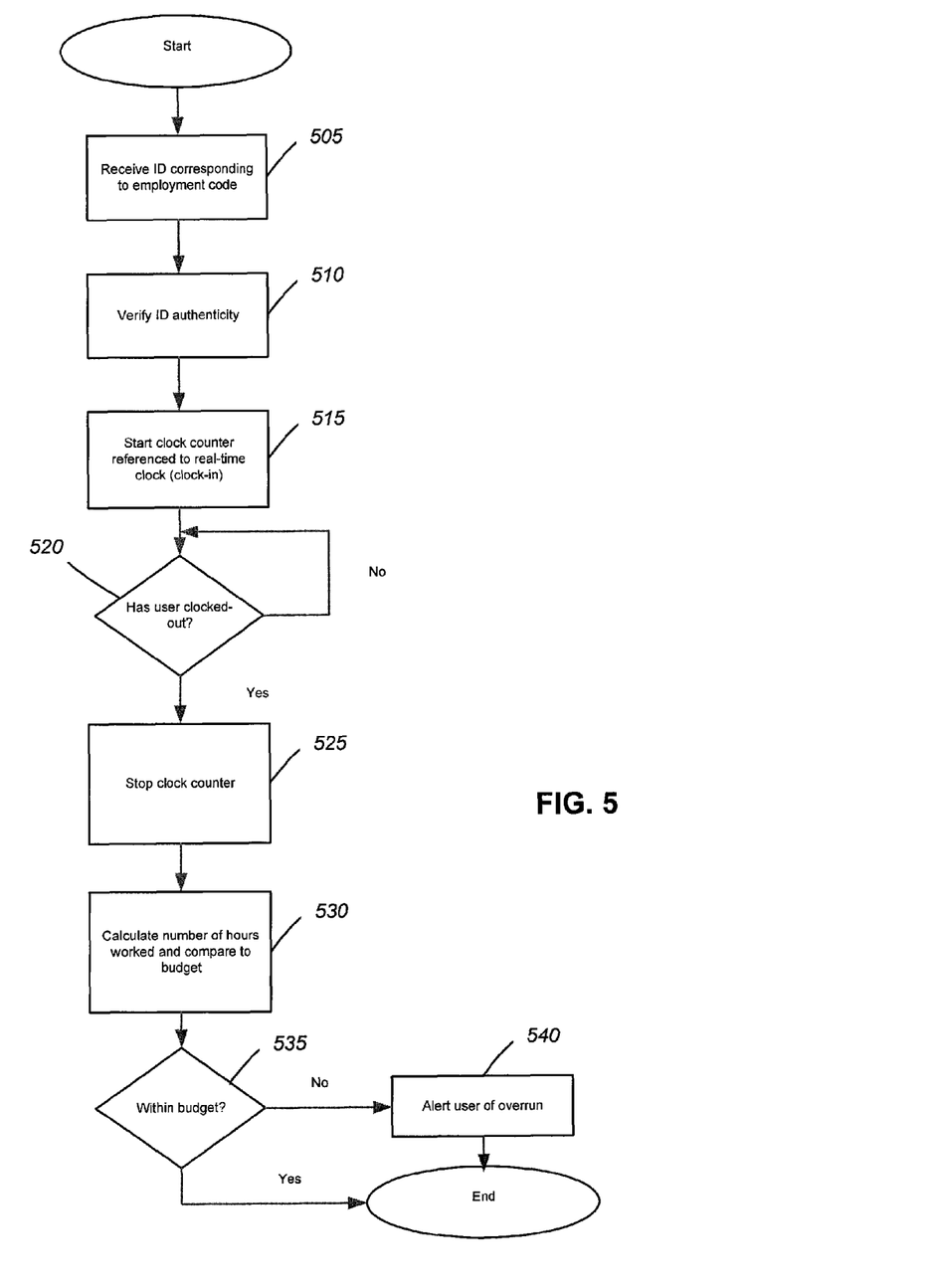

Referring to the flowchart of FIG. 5, a process performed by a processor executing instructions from an information link application begins, at step 505, with the receipt of an ID corresponding to an employment code. This ID may identify a retail location, for example, or may identify the user's home, indicating that she is working from home. Alternatively, the ID could indicate that the employee is traveling to a retail location, or could indicate a particular job activity such as display adjustment, inventory audit, or the like. The ID may be authenticated at step 510 and a real-time counter may be started (515). The counter can continue (520) until the user clocks-out, at which point the counter can be stopped (525). The user may clock out by pressing a button 35 on the PDA 10 or by scanning an ID, for example, and may do so during breaks or when the job is finished. The counter value may represent the actual amount of time spent working on a project, and this value may be compared to a budgeted value at steps 530 and 535. The budgeted value may be obtained from a database 90, 135, or may be received via a message. If the actual time exceeds the budgeted volume, the user may be alerted to the overrun (540).

The information link application may be configured to permit the user the opportunity to scroll up and back through the database. For instance, after scanning a UPC to learn its home pocket is "A12," the user can scroll the handheld display to see what should go in pocket A13, scroll again to see what product should go in A14, etc. This may be accomplished through input provided via a designated scroll button or another of the input means described above. The user may thus be enabled, for example, to scroll through an entire greeting card or gift wrap department's pocket data using the scroll button on the handheld device.

The information retrieved from the database regarding the product that is to be displayed in a designated location may include an image of the product. Accordingly, the user may stand before a display rack, scroll through the pocket data, and compare the image on the screen to the products that are physically in the display locations (e.g. card pockets).

In some embodiments, a variety of information may be displayed on a convenient user interface, which may include text and graphics, on a display screen. In one example, the user interface may be displayed in all or a portion of the viewable area of a display screen, such as a window. The window may include a title bar area, a menu bar area, an information display area, and a user input area. The title bar area may display, for example, general information such as the current time, total time of operation, and the name of the application program to which the window pertains.

The menu bar may include one or more functions or drop-down menus, for example, that may be activated or displayed in response to user selection. Drop-down menus may include general or application specific operations, some of which may have sub-commands that may be displayed for selection as a sub-menu. In one implementation, the drop-down menu includes the following operations: function, option, review, and leave. For example, a territory assistant may activate the "leave" operation to indicate the time at which work has been completed at a particular retail store, and this information may be used by the time reporting and time monitoring component 225, described above.

The information display area may include a variety of information in different formats, fonts, or colors, and may use proprietary or standard formats such as: text, bitmap, jpeg, html, pdf, mpeg, and the like. Some of the information displayed in the display area may be received from either local or remote memory. The information displayed in the information display area may include, but is not limited to, any or all of the following elements: SKU, retail store identification, operator identification, product location, product description, mode, UPC, price, number of product to place in the product location, stock number, last known quantity, re-order quantity, recent sales history, recent re-order history, recent shipment history, recent audit history, and recent inventory. In addition, some embodiments, the information display area may further include some user input controls, such as a "ship details" button, for example, that allows the user to call up for display additional details related to the shipping history. In some embodiments, the information display area may further display an "adjustment quantity" to indicate, for example, a number that the user wishes to adjust. For example, the user may update the number displayed in a particular field, such as the quantity "on hand," by selecting the "on hand" with a finger, stylus, cursor, etc. . . . , and then selecting a new value for the "adjust quantity" field. The user may be able to select a numeric value for the adjustment quantity by using, for example, a keypad or the user input area.

The user input area may include a display graphics or text for user input alpha-numeric or other information. In some examples, the user may input information in the user input area using a touch sensitive screen configured to receive user input in response to contact in specific locations on the screen, such as may be made with a finger, stylus, cursor, or similar input mechanism.

A number of embodiments of the invention have been described. Nevertheless, it will be understood that various modifications may be made without departing from the spirit What claimed is:

1. A handheld scanning system for managing inventory, the system comprising:
   a scanner configured to read identification symbols on a product;
   a communication interface configured to receive information from a remote information repository;
   a processor coupled to the scanner and to the communication interface;
   a display device coupled to the processor; and
   a memory containing program instructions that, when executed by the processor, cause operations to be performed, the operations comprising:
      receive information that represents identification symbols of an inventory item that has been scanned;
      receive information from the scanner, wherein the information received from the scanner indicates a current location on a retail display where the inventory item is located;
      identify a correct location retail display location at which the inventory item should be located in a retail store environment by looking up the correct location in a data store using the information;
      determine, based on a comparison of the correct location and the current location, that the correct location does not match the current location; and
      output for display on the display device, the correct retail display location in response to said determining that the correct location does not match the current location.

2. The system of claim 1, wherein the operations further comprise:
   retrieve from a data storage device a predetermined minimum inventory level for the inventory item; and
   generate a command to transmit a message representing a request to re-order one or more of the inventory items, wherein the request is based on a current amount of the inventory item on a retail shelf and the corresponding predetermined minimum inventory level.

3. The system of claim 2, wherein generating the command to transmit a message representing a request to re-order based on the determined number of each type of product and the corresponding predetermined minimum inventory level comprises determining that the determined number of each type of product is less than the corresponding predetermined minimum inventory level.

4. The system of claim 2, wherein retrieving from a data storage device a predetermined minimum inventory level for the inventory item further comprises retrieving one or more of shipment information, assignment information, territory coverage information, product pricing and availability information, information on discounts, and scheduling information.

5. A handheld scanning system comprising:
   a scanner configured to read identification symbols on a product;
   a communication interface configured to receive information from a remote information repository;
   a processor coupled to the scanner and to the communication interface;
   a display device coupled to the processor; and
   a memory containing program instructions that, when executed by the processor, cause operations to be performed, the operations comprising:
      in response to the scanner reading a product identification symbol disposed on a retail product, identify a correct location at which the retail product should be located in a retail store environment, the correct location being identified by looking up the correct location in a data store using the product identification symbol that is read from the retail product;
      in response to the scanner reading a second identification symbol disposed on a retail display location at which the retail product is currently located, identify a current location at which the retail product is currently located in the retail store environment, the current location being identified based on the second identification symbol that is read from the retail display location;
      determine, based on a comparison of said correct location with said current location, that the current location does not match the correct location; and
      output to the display device an alert indicating the retail product is incorrectly located.

6. The system of claim 5, wherein the product identification symbol disposed on the retail product is different from second identification symbol disposed on the retail display location.

7. A method for managing inventory displays within a retail store environment, the method comprising:
   reading, at a hand-held computing device, a product identification symbol disposed on a retail product;
   identifying a correct location at which the retail product should be located in the retail store environment by looking up the correct location in a data store using the product identification symbol that is read from the retail product;
   reading a location identification symbol disposed on a retail display location at which the retail product is currently located;
   identifying a current location at which the retail product is currently located in the retail store environment by looking up the location identification symbol in a data store that comprises retail store locations and associated location identification symbols;
   determining, based on a comparison of said correct location with said current location, that the current location does not match the correct location; and
   outputting to the display device data indicating the correct retail display location responsive to said determining that the current location does not match the correct location.

8. The method of claim 7, wherein the product identification symbol comprises a Universal Product Code.

9. The system of claim 5, wherein the product identification symbol comprises a Universal Product Code.

10. The system of claim 1, wherein the identification symbol comprises a Universal Product Code.

11. The system of claim 5, wherein the scanner is an optical scanner.

12. The system of claim 1, wherein the scanner is an optical scanner.

13. The method of claim 7, wherein the method further comprises monitoring an amount of time a user has worked with the hand-held computing device and sending the amount of time to a remote server.

14. The system of claim 5, wherein the operations further comprise monitoring an amount of time a user has worked with the scanner and sending the amount of time to a remote server.

15. The system of claim 1, wherein the operations further comprise monitoring an amount of time a user has worked with the scanner and sending the amount of time to a remote server.

16. The system of claim 5, wherein the operations further comprise outing to the display data indicating the correct retail display location responsive to said determination that the current location does not match the correct location.

\* \* \* \* \*